Dec. 14, 1965 H. L. HERTEL ETAL 3,223,360
VTOL AIRCRAFT JET INSTALLATION
Filed Oct. 10, 1962 3 Sheets-Sheet 1
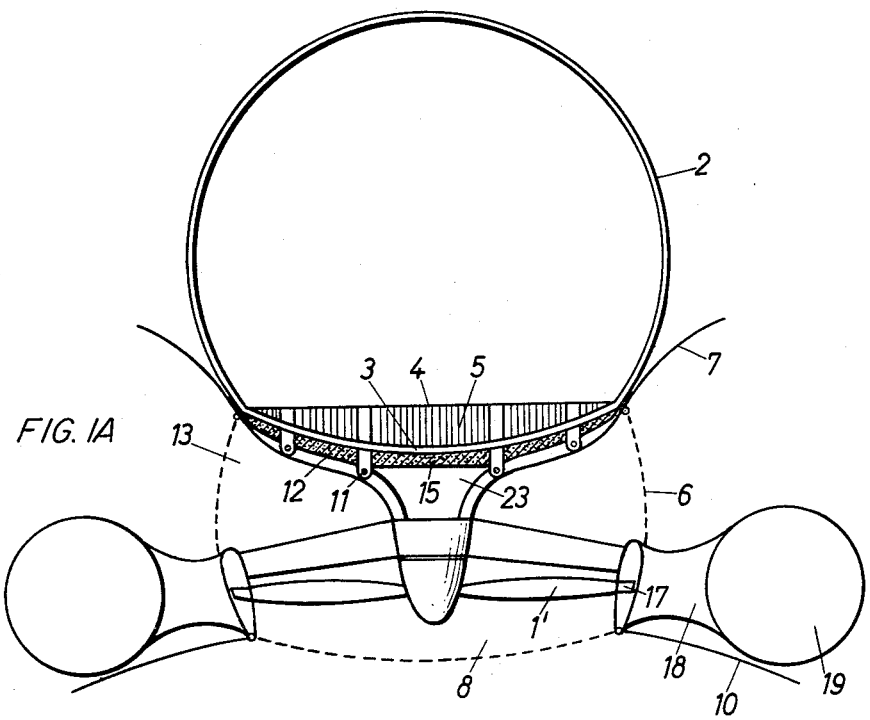
FIG. IA
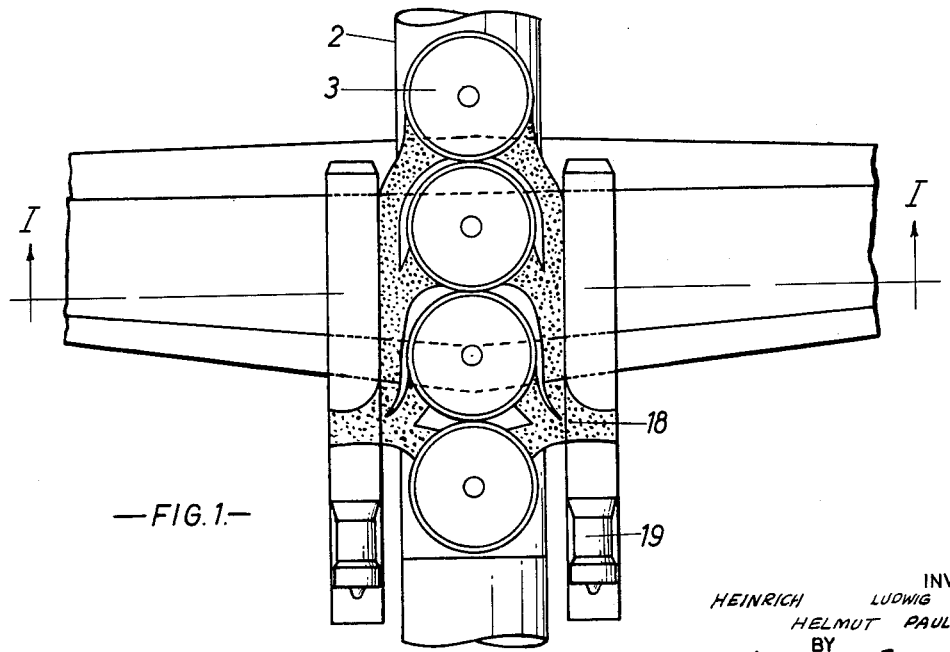
—FIG. 1.—
INVENTOR:
HEINRICH LUDWIG HERTEL
HELMUT PAUL KRUG
BY
*Otto John Munz*
ATTORNEY

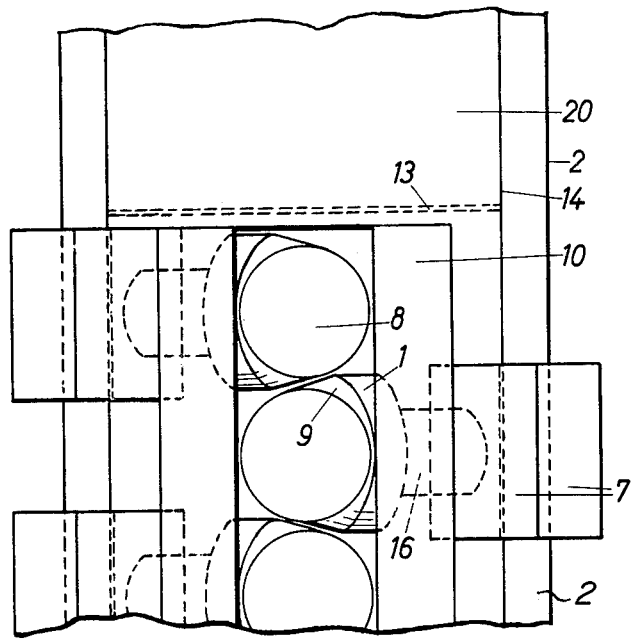
FIG. 2A
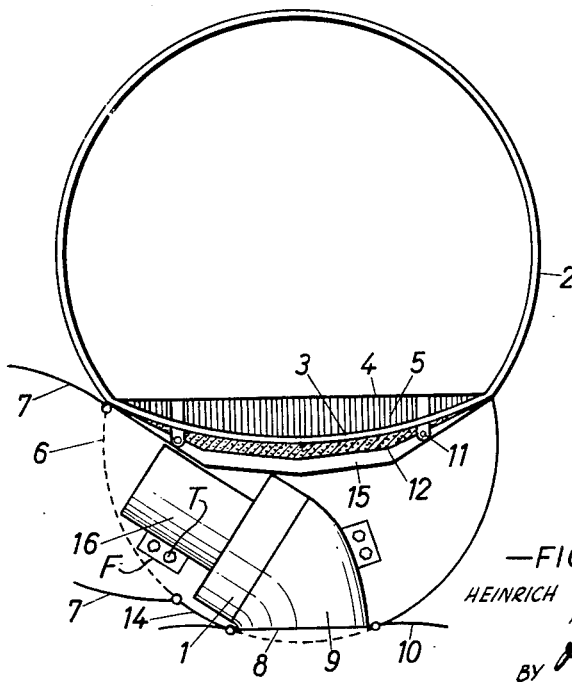
FIG. 2.—

Dec. 14, 1965  H. L. HERTEL ETAL  3,223,360
VTOL AIRCRAFT JET INSTALLATION
Filed Oct. 10, 1962  3 Sheets-Sheet 3
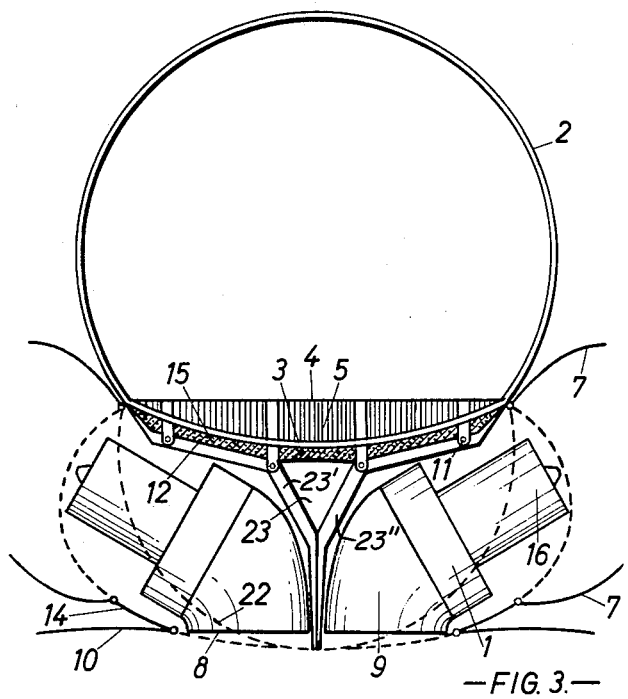
—FIG. 3.—
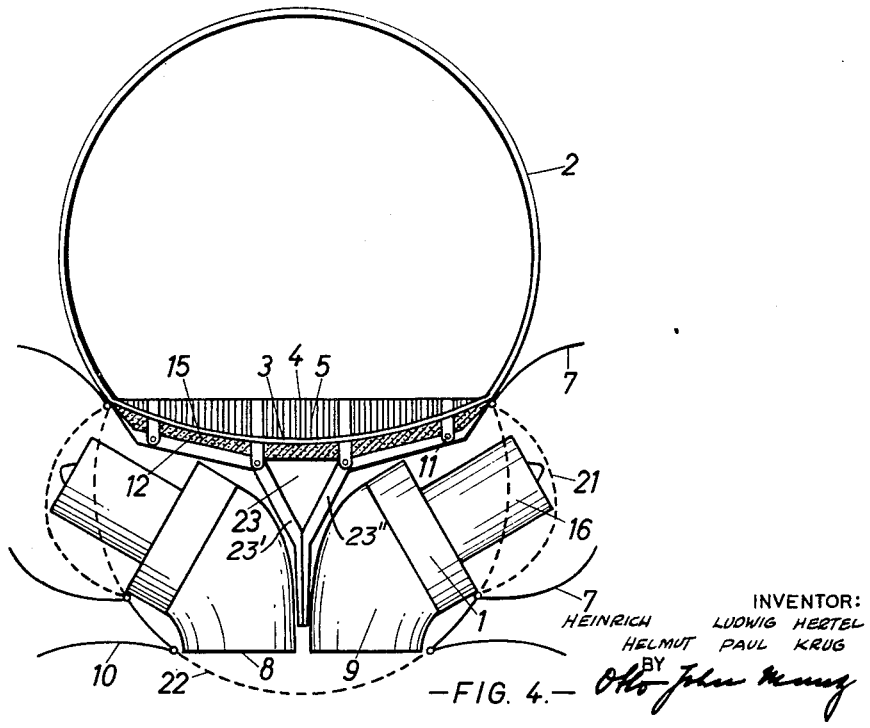
—FIG. 4.—
INVENTOR:
HEINRICH LUDWIG HERTEL
HELMUT PAUL KRUG
BY
ATTORNEY United States Patent Office 3,223,360
Patented Dec. 14, 1965

3,223,360
VTOL AIRCRAFT JET INSTALLATION
Heinrich Ludwig Hertel, Berlin-Charlottenburg, and Helmut Paul Krug, Berlin, Germany, assignors to Vereinigte Flugtechnische Werke Gesellschaft mit beschraenkter Haftung frueher "Weser" Flugzeugbau/Focke-Wulf/Heinkel-Flugzeugbau, Bremen-Flughafen, Germany
Filed Oct. 10, 1962, Ser. No. 236,177
Claims priority, application Germany, Oct. 12, 1961, F 35,123
10 Claims. (Cl. 244—23)

The present invention concerns an arrangement of lifting jet installations such as lifting rotors, lifting injectors, and lifting jet turbines by means of which lifting jet an aircraft rises from the ground vertically or at a steep angle in a vertical take-off or a short start take-off, hovers, climbs and again lands vertically or at a correspondingly steep angle.

Lifting jet devices on aircraft are known per se with the lifting jets either in the supporting wing, in the fuselage or even in auxiliary gondolas on the supporting wings.

The previously known arrangements of the lifting jets have substantial disadvantages. Thus, the supporting structure is interrupted by the lifting jets in the wings and the wings are therefore heavy; the detrimental resistance is increased; and the jet installation takes up space in the supporting wings which is important for the carrying of fuel. The installation of lifting devices in gondolas or nacelles fastened to the wings introduce aerodynamic disadvantages affecting the horizontal drag and the increasing drag on approaching the speed of sound.

The incorporation of the lifting jet installation into the fuselage, especially on commercial aircraft, is associated with very great disadvantages since the incorporation of a pressurized or pressure tight passenger space is thereby decisively disturbed and it is difficult to keep the space in the fuselage free from shaking and vibrating and to safeguard it against fire in the power plant.

Finally from the standpoint of the installation and supervision, therefore with reference to safety, the poor accessability of the installation when incorporated in a fuselage is disadvantageous and it is clearly desirable to separate the propulsive mechanism and the lifting plant installation.

According to the present invention the lifting jet installation is arranged beneath the fuselage, clearly separated from the supporting and if necessary pressure tight fuselage body, thereby to a large extent avoiding the above described disadvantages of the known solutions of this problem.

The arrangement in accordance with the invention can moreover combine in itself a number of advantages which the previously known solutions offered only individually. Thus, the underfloor construction in accordance with the invention can form a closed separable unit as the lifting gondolas present.

The invention will be described further, by way of example, with reference to the accompanying drawings, in which:

FIG. 1 shows the lifting jet installation formed of generators and lifting jets beneath the fuselage of an aircraft;

FIG. 1A is an enlarged section taken on the line I—I of FIG. 1.

FIG. 2 shows the underfloor arrangement of two-circuit lifting jet turbines in a row;

FIG. 2A is a partial bottom view as seen in the direction of the arrow of FIG. 2;

FIG. 3 shows the arrangement of FIG. 2 broadened to provide double rows with pairwise lifting jets; and FIG. 4 shows a variation of FIG. 3.

As is evident from the drawings the invention is based on the feature of fitting to aircraft, for vertical and steeply inclined takeoff and landing, lifting jets 1 beneath the floor of the fuselage, which in general consist of a pressure tight skin with an upper shell 2 and a lower shell 3 as well as the flooring 4, which is connected by means of cross frames 5 to the lower shell 3.

There should be the greatest possible clear separation between the underfloor installation and the fuselage which is a closed shell.

The air admission to the underfloor installation is effected from its longitudinal sides through lateral inlets 6 which are closed by flaps 7 when flying in normal horizontal flight.

The jet outlet 8 is directed vertically downwards; the jet can however be diverted from the vertical for steering or control and for horizontal movement of the aircraft whilst hovering.

A jet diverter 9 is incorporated with obliquely installed jets. Moreover the jet outlet is covered when flying fast by means of flaps 10.

The separation between the lower part of the fuselage and the lifting installation can go so far that this underfloor installation forms one or a plurality of constructional units which are attached to the fuselage with fittings 11. The stiffness of the bearers, formed out of the fuselage lower shell 3 as the lower flanges, the flooring 4 as the upper flanges, and transverse frame 5 as a web, provide extraordinary mounting possibilities. These constructional units which in general have an upper shell 12, cross walls 13, FIG. 2, and a lower shell 14, can easily be installed or, if desired, taken out and exchanged.

The arrangement in accordance with the invention enables the following advantages to be realised:

The fuselage is left undisturbed as the load carrying part of the aircraft which is particularly important with a pressurised cabin.

It is possible, nevertheless, through the organic investment into the main spar of the aircraft fuselage, to reduce to a minimum the unavoidable additional resistance due to the volume of the lifting installation and to make the shape also appropriate for high sub-sonic mach numbers or for supersonic speeds. By arranging the lifting jet in the plane of symmetry of the aircraft the occurrence of moments about the longitudinal axis is avoided in the event of one jet failing. By means of the external suspension 11 of the installation on the fuselage, the great rigidity of the fuselage can be exploited and hence the jet installations can be mounted in subdivided groups, which in turn enables them to be easily dismounted again and exchanged.

The installation can be elastically attached to the fuselage in flexible or resilient mountings in such a way that shaking and vibrations of the underfloor portion are not transmitted to the upper portion of the fuselage.

It is possible to introduce insulation between the lower shell 3 of the cabin and an upper wall of the underfloor installation for the protection of the cabin against vibrations, sound and heat, as well as against fire in the lifting power plant.

The generators or jet turbines or such like driving mechanism of the lifting jets can be either wholly or partially installed beneath the floor. For example the full under floor installation is shown in FIGS. 2 and 3 as an obliquely positioned two circuit lift jet turbines 16 removably secured to walls 13 by means of flanges F and threaded fasteners T. An example for partial installation is shown in FIG. 1 in which the lifting jet rotor 1' is provided with a flat nose turbine 17 which receives the hot gas through the admission duct 18 from the outside to the under floor installation of the generator 19 fitted thereto, which, when flying in the normal horizontal direction supplies the jet displacement drive.

The lifting power plant only occupies a small fraction of the fuselage space, especially if it is constructed in such a concentrated manner as in FIG. 3 with a twin arrangement of the jet turbines. Each pair of outlets 8 on opposite sides of the longitudinal central plane defines a "set." Since the strake, defined by shell 14, passes through the lower space from the nose to the tail, free spaces 20 are produced in front of and behind the lifting installation and these spaces can be used as freight spaces or holds; they could without difficulty be included in the fuselage pressure chamber if the under floor space in particular is constructed with a circular cross section as is shown in FIG. 2 or could be merged from a local bulge 21 with an aerodynamically useable strake into the circular form 22 of the lower space 20.

A passage 23 can be formed between the fuselage lower shell 3 and the under floor installation, for examle by securing structural members 23' and 23", forming a stringer, to the fuselage; and this passage can be used for rods and ducts.

It is obviously not always expedient to construct the underfloor installation without any disturbance of the lower portion of the cabin. Local interference, for example for the installation of projecting portions, is hence permissible without infringing the principle.

Moreover it is possible for the fuselage shell to be altered in such a way as to deviate locally from the classical construction of a fuselage pressure space, so that advantages occur for the under floor installation.

In the claims, the terms "horizontal," "vertical" are merely for convenience in defining the relations of the parts as viewed upon the drawing, and are not to be interpreted as limiting the craft to any particular attitude in actual flight.

We claim:

1. In a vertical take-off and landing aircraft, an enclosed fuselage having a central longitudinal axis, a pair of lifting jet devices, each having a downwardly-directed air outlet and an upwardly- and outwardly-directed air inlet, and means mounting each said device beneath said fuselage in suspended connection therewith, with said outlets in symmetrical relation with a normally vertical plane through said axis and said inlets directed outwardly and upwardly at respectively opposite sides of said fuselage.

2. The aircraft of claim 1, said outlets being arranged symmetrically upon opposite sides of a normally vertical plane through said axis.

3. The aircraft of claim 2, the outlets on each respective side of said plane forming a set, said mounting means comprising a stringer secured to and depending from and beneath said fuselage, along said axis and between said sets of outlets, said stringer forming an enclosed space for conduits extending along and beneath said fuselage and between said lift devices.

4. The aircraft of claim 1, each said outlet being arranged symmetrically in a vertical plane through said axis and in spaced relation therealong.

5. In a vertical take-off and landing aircraft, an enclosed fuselage having a central longitudinal axis, a plurality of pairs of lifting jet devices each having a downwardly-directed air outlet and an upwardly- and outwardly-inclined air inlet, and means mounting all said devices beneath and suspended from said fuselage in spaced relation therewith, with each said pair of devices symmetrically disposed in a respective one of a plurality of longitudinally-spaced planes normal to said longitudinal axis, each said outlet being downwardly directly beneath said fuselage, and each said inlet of a respective pair being directed outwardly and upwardly on respectively opposite sides of said fuselage.

6. The aircraft of claim 5, all said outlets being arranged sequentially and symmetrically in and along a vertical plane through said axis.

7. The aircraft of claim 5, right and left forward propulsion jet units each mounted beneath said fuselage at a respective side of and outwardly of said outlets, and ducts connecting each said forward propulsion jet unit with said lifting jet devices, to supply hot gas thereto.

8. A VTOL aircraft, comprising a closed unitary fuselage having a central longitudinal axis, a plurality of vertical lift devices each having a downwardly-directed air outlet and an upwardly- and outwardly-inclined air inlet, and means mounting all said lift devices from and beneath said fuselage, with all said outlets spaced along said axis and symmetrical with respect to a vertical plane therethrough, alternate ones of said inlets being directed upwardly and outwardly of said fuselage on respectively opposite sides thereof.

9. The aircraft of claim 8, and flap means hinged to said aircraft for pivoting about axes parallel with said longitudinal axis, and operable to conjointly close said inlets and outlets.

10. The aircraft of claim 8, all said lift devices being detachable as a unit from said fuselage.

References Cited by the Examiner

UNITED STATES PATENTS

| 1,723,012 | 8/1929 | Caminez | 244—54 X |
|---|---|---|---|
| 2,715,001 | 8/1955 | Provenzano | 244—118 |
| 2,722,391 | 11/1955 | Krieghoff | 244—54 X |
| 2,838,257 | 6/1958 | Wibault | 244—23 |
| 2,926,868 | 3/1960 | Taylor | 244—52 X |
| 2,936,973 | 5/1960 | Kappus | 244—23 |
| 2,990,137 | 6/1961 | Willis | 244—12 |
| 3,037,723 | 6/1962 | Taylor | 244—23 |
| 3,043,538 | 7/1962 | Taylor | 244—53 X |
| 3,048,011 | 8/1962 | Tumaircus | 244—52 X |
| 3,061,243 | 10/1962 | Simon | 244—23 |

FOREIGN PATENTS

| 907,398 | 10/1962 | Great Britain. |
|---|---|---|
| 441,415 | 11/1948 | Italy. |

FERGUS S. MIDDLETON, *Primary Examiner.*

MILTON BUCHLER, *Examiner.*